United States Patent [19]
Buhler et al.

[11] 3,910,527
[45] Oct. 7, 1975

[54] WEB DISTRIBUTION CONTROLLED SERVOMECHANISM IN A REEL-TO-REEL WEB TRANSPORT

[75] Inventors: Otto R. Buhler; Joseph T. Cutter; John P. Mantey, all of Boulder; David R. Wood, Longmont, all of Colo.

[73] Assignee: International Business Machines Corporation, Armonk, N.Y.

[22] Filed: Mar. 8, 1974

[21] Appl. No.: 449,577

[52] U.S. Cl. .................................... 242/186; 318/7
[51] Int. Cl.² ...................... B65H 59/38; G03B 1/04; G11B 15/32
[58] Field of Search ........................... 242/182–191; 178/6.6 R, 6.6 A; 360/72–74; 318/7

[56] References Cited

UNITED STATES PATENTS

| | | | |
|---|---|---|---|
| 3,137,767 | 6/1964 | Axon et al. | 178/6.6 |
| 3,229,927 | 1/1966 | Cohler | 242/184 |
| 3,454,960 | 7/1969 | Lohrenz | 242/184 |
| 3,669,382 | 6/1972 | Struzina | 242/186 |
| 3,761,035 | 9/1973 | Wang | 242/182 |
| 3,764,087 | 10/1973 | Paananen et al. | 242/186 |

OTHER PUBLICATIONS

IBM Technical Disclosure Bulletin, Vol. 15, No. 11, Apr., 1973, pp. 3485–3487.

*Primary Examiner*—Leonard D. Christian
*Attorney, Agent, or Firm*—Joscelyn G. Cockburn; Francis A. Sirr

[57] ABSTRACT

The parameters, i.e., acceleration/deceleration, speed, position and tension, of a length of unbuffered magnetic recording tape, which runs between the two reels of a reel-to-reel tape transport, are accurately controlled by a closed-loop servomechanism which is controlled as a function of the tape distribution between the two reels. A number of design-point servo networks are constructed and arranged to energize the reel motors, based upon the assumption that given tape distributions exist. The outputs of these point servo networks are weighted or blended by a network which is controlled in accordance with actual tape distribution. The output of the weighting network is then used to control reel motor energization.

14 Claims, 12 Drawing Figures

WEB DISTRIBUTION CONTROLLED SERVOMECHANISM IN A REEL-TO-REEL WEB TRANSPORT

BACKGROUND AND SUMMARY OF THE INVENTION

The present invention pertains to the general field of winding and reeling, and more specifically to the field of the reeling and unreeling of web-like material which carries machine-convertible information, and to the simultaneous control of plural reel drives thereof.

This web-like material may be magnetic tape whose discrete states of magnetization in localized areas are the machine-convertible information or digital data. Transports for magnetic tape can be broadly characterized as buffered or unbuffered. The present invention relates to the latter type and particularly to a transport which is further characterized as a reel-to-reel transport wherein a length of unbuffered magnetic tape tautly extends between a supply reel and a take-up reel. This length of tape cooperates with a tape processing station, which may include various means, such as a read head, a write head, an erase head, a tape cleaner, and a BOT/EOT assembly. The tape speed, position and tension parameters must be accurately controlled as the tape passes through the tape processing station, and in most applications must be maintained piecewise-constant, i.e., constant over an interval. This is accomplished by controlling the energization of the two reel motors.

As is well known, the two reels constitute continuously variable loads, as the tape distribution varies between the two reels. Prior art reel-to-reel tape transports have provided means to control the reels in accordance with this variable load characteristic. For example, a tape feeler has been provided to measure the reel's tape radius and to provide an electrical signal to the reel motor which varies in accordance with this radius. Another known arrangement provides a digital encoder, driven by the reel motor, such that the rotation of the motor provides a signal which is a measure of the reel's tape radius. This signal is then used to control the energization of a reel motor so as to maintain the tape and speed constant.

The basic components of a reel-to-reel web or tape transport are a take-up reel driven by a first motor, a supply reel driven by a second motor, an unbuffered tape path for guiding the tape between the two reels, and a tape processing station or magnetic transducer such as a read/write head located in the tape path and forming a transducing interface with the magnetic recording tape at this location.

The goal of the two-motor servomechanism is to dynamically control the tape's acceleration/deceleration, speed, tension, and position parameters at this transducing interface. The input commands to the servo are binary conditions such as start/stop and forward/backward. From these commands, the servomechanism energizes the two motors such that the tape moves in a desired manner.

The structure of the present invention includes a plurality of design-point servo networks, each of which is constructed and arranged to energize its reel motor so as to provide desired tape parameters if a given tape distribution exists. For all other distributions, this energization is incorrect. The outputs of these point servo networks are then blended or weighted by a network whose input control signal is a measure of the actual tape distribution.

These point servos are constructed in pairs, since an assumed tape quantity on one reel predetermines the quantity on the other reel. Then, if it is assumed that substantially all of the tape is on the supply reel (defined as the beginning of tape or BOT condition), then, of course, the take-up reel must be substantially empty. For this condition, a pair of BOT point servos are constructed, one to energize the supply reel motor based on the assumption that its reel load is at a maximum, and the other to energize the take-up reel motor based on the assumption that its reel load is at a minimum.

Each of the point servos compares the tape's actual parameter to a reference which defines the desired tape parameter. As a result of this comparison, the point servo originates a control signal. These control signals, one for each point servo pair, are then blended in accordance with actual tape distribution. As a result of this blending, the reel motors are energized in a manner to continuously achieve a desired tape parameter, as the tape distribution between the reels continuously changes.

The term "point" as used herein is meant to define a given tape distribution between the two reels, for example, 20 percent of the tape on the take-up reel and 80 percent of the tape on the supply reel. A design-point servo constructed and arranged to energize the reel motor for this exemplary distribution would, for example, supply correct energization for the takeup reel motor only when 20 percent of the tape existed on that reel, whereas the corresponding point servo for the supply reel motor would supply correct energization only when 80 percent of the tape existed on that reel.

A plurality of these point servos are constructed and arranged to cover the entire range of tape distribution, The outputs of all point servos for a particular reel motor are weighted or blended in accordance with actual tape distribution. This weighted output is then used to control energization of the reel motors.

The foregoing and other features and advantages of the invention will be apparent from the following more particular description of a preferred embodiment of the invention as illustrated in the accompanying drawing.

DESCRIPTION OF THE PREFERRED EMBODIMENT

Figure 1:
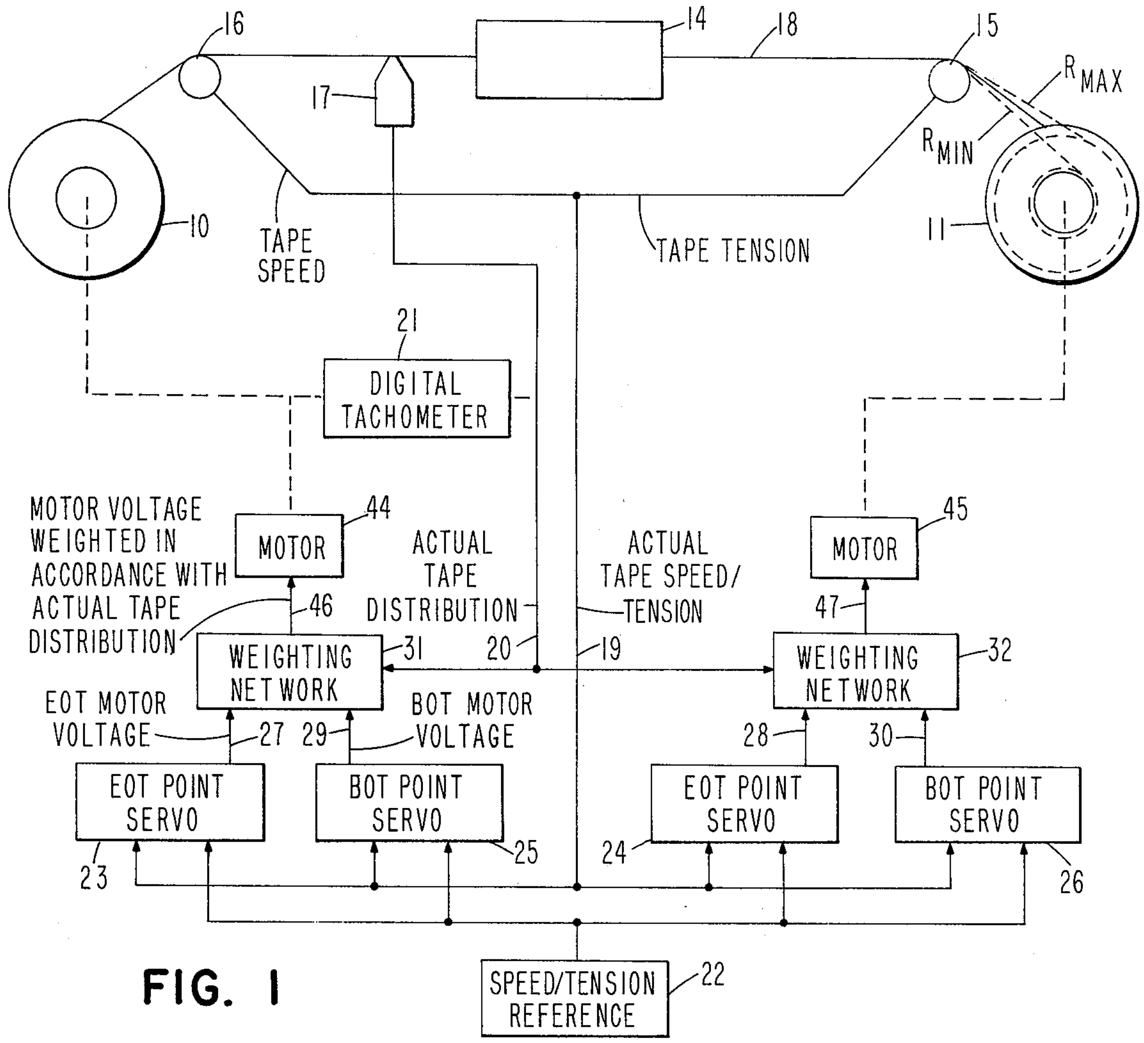
FIG. 1 is a diagrammatic showing of a magnetic tape reel-to-reel web transport incorporating the present invention wherein two point servos are provided for each reel motor.

Referring to FIG. 1, the web transport diagrammatically disclosed therein is a simplified reel-to-reel magnetic tape transport which facilitates an explanation and an understanding of the present invention. Many of the structural details of such a web transport have been eliminated to simplify the disclosure. For example, various tape support and guidance devices are not disclosed. Furthermore, details of the supply reel or supply cartridge, the manner of threading the end of the tape from the supply reel to the take-up reel, and the means of attaching the end of the tape to the take-up reel, as by vacuum force, have not been disclosed. The following description of the present invention, and of the manner and process of making and using the same is in such full, clear, concise and exact terms as to enable any person skilled in the art to which the present invention pertains, or with which it is most nearly connected, to make and use the same, without a detailed disclosure of the various devices of this type which most likely would be used in the commercial embodiment of a web transport incorporating the teachings of the present invention.

In a precision reel-to-reel tape transport, proper cooperation between the magnetic tape and the read/write head requires that the tape's acceleration/deceleration, speed, position and tension parameters be accurately and continuously controlled throughout the entire length of the tape.

The apparatus of FIG. 1 provides two separate point servos, an EOT (end-of-tape) servo and a BOT (beginning-to-tape) servo, for each of the two reel motors 44 and 45. Each of these two servos compares the actual value of the tape parameter(s) being controlled to a reference or command value for that parameter, for example speed and/or tension, to thereby originate an error signal. Ideally,, the reference value is calculated to achieve the desired tape speed and tension, with no error, when a given tape distribution exists, in this case with substantially all of the tape on the supply reel, i.e., the BOT condition, and with substantially all of the tape on the take-up reel, i.e., the EOT condition. Should an error exist, the above-mentioned comparison and the resulting parameter error signal provides the necessary closed-loop servo corrective action.

The BOT and EOT point servos are controlled by reference signals and feedback signals to provide an output signal. Each servo is constructed and arranged to energize its reel motor based on an assumed load condition. For example, based upon the assumption that the tape is beginning its travel from the supply reel to the take-up reel (BOT), or that the tape has ended its travel from the supply reel to the take-up reel (EOT), respectively. In actual practice, however, the BOT and EOT conditions cannot occur simultaneously, and in fact the tape distribution is usually somewhere between these two extremes. Therefore, the outputs of the EOT and BOT servos are applied to a blending or weighting network which blends or weights these two signals in accordance with actual tape distribution between the two reels. For example, when the tape is at the BOT position, the weighting is such that the full output of the BOT servo is used to energize its motor, and a minimal portion of the output of the EOT servo is used.

A refinement of the above-described servo network provides a larger number of design-point servos with additional servos constructed to energize the two reel motors for various tape distribution points between the BOT/EOT extremes, wherein the outputs of all servos are dynamically blended in accordance with actual tape distribution.

FIG. 1 shows an idealized reel-to-reel tape transport having a supply reel 10 and its motor 44, a take-up reel 11 and its motor 45, and a tape processing station 14 including a read/write head, etc. Motors 44 and 45 are preferably direct current motors. Tape tension sensor 15, tape speed sensor 16, and tape distribution sensor 17 are associated with the length of unbuffered magnetic tape 18 running between the two reels. Sensors 15 and 16 provide an output 19 indicative of actual tape speed/tension. Sensor 17 provides an output 20 indicative of actual tape distribution between the two reels. The range of possible tape distribution is shown by the legends "R max" and "R min" associated with take-up reel 11.

Sensors of this type are well known to those of skill in the art. Tension sensor 15 may be a roller, or an air bearing, which is mounted on strain gages. For example, sensor 15 may be of the type disclosed in the IBM TECHNICAL DISCLOSURE BULLETIN, Volume 16, Number 7, December 1973, at pages 2267 and 2268. Speed sensor 16 may be a roller which is driven by the tape, which roller is in turn connected to drive the movable element of either an analog or a digital tachometer. Distribution sensor 17 may be a magnetic read head which reads a clock track on tape 18, such that the output of sensor 17 may be logically processed to provide an output indicative of the length of tape which has passed the sensor on its way to take-up reel 11. In the alternative, position sensor 17 could be replaced by a digital tachometer 21 which is driven by motor 44. The output of this digital tachometer would be processed, as by a counter, to provide an output indicative of the actual tape distribution between the two reels.

Tape movement is controlled by speed/tension reference network 22. This network provides reference or command signals calculated to cause the tape to move past station 14 at a predefined speed and with a predefined tension. These signals are applied as a first control input to EOT servo pair 23 and 24, and BOT servo pair 25 and 26, two of which are associated with each of the reel motors. The actual tape speed/tension signal on cable 19 is applied to these servos as a second control input. Each of these servos provides an output voltage, on conductors 27–30, respectively, calculated to energize its motor based on the assumption that the tape is at both the EOT and the BOT position simultaneously. Of course, these two conditions cannot exist simultaneously. Therefore, weighting networks 31 and 32 blend or weight outputs 27–30, in accordance with the actual tape distribution signal on conductor 20. Output 46 of weighting network 31 controls the energization of motor 44, whereas output 47 of weighting network 32 controls the energization of motor 45.

These servos are constructed in pairs. For example, BOT servos 25 and 26 are constructed to properly energize motors 44 and 45, respectively, when reel 10 is substantially full and reel 11 is substantially empty, respectively.

Figure 2:
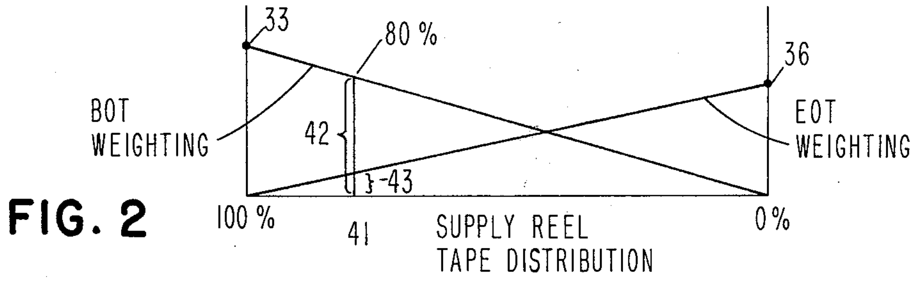
FIG. 2 is a graph depicting the blending or weighting of the two point servo networks of FIG. 1 which control the supply reel motor, as the outputs of these networks are weighted in accordance with the tape quantity on the supply reel.

FIG. 2 is a graph depicting the operation of network 31. In this graph the tape distribution coordinate terminates at the two extremes 100 percent of the tape on the supply reel and 0 percent of the tape on the supply reel.

The BOT servo 25 is controlled by speed/tension reference 22 to provide an output voltage calculated to achieve proper energization of motor 44 when 100 percent of the tape is on the supply reel. The magnitude of this output voltage can dynamically vary, in accordance with a comparison of reference signal 22 to feedback signal 19. Likewise, EOT servo 23 is controlled by speed/tension reference 22 to provide an output voltage whose dynamic variation is in accordance with a comparison to feedback 19.

Assuming that the actual tape distribution is as represented by 41, that is, approximately 80 percent of the tape is on the supply reel, the weighted energizing voltage applied to a reel motor has a weighted magnitude which is the sum of 42 and 43. The magnitudes 42 and 43 represent the respective weighted output contributions which the outputs of BOT servo 25 and EOT servo 23 make to the output of weighting network 31 for this particular tape distribution. The actual magnitude of voltages 42 and 43, are dynamically dependent upon the output magnitude of the BOT servo and the EOT servo, as these outputs vary in accordance with the difference between the reference tape parameters defined by network 22 and the actual tape parameters measured by sensors 15 and 16.

Figure 3:
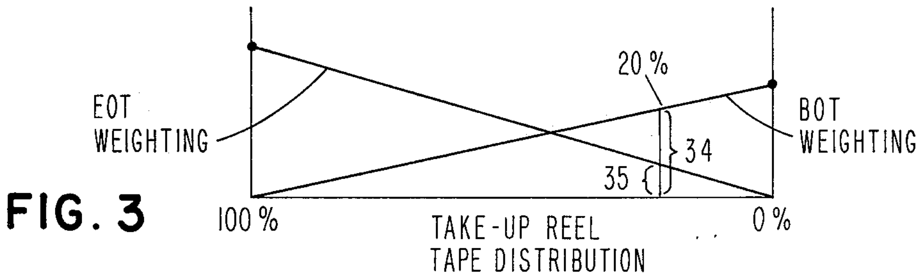
FIG. 3 is a graph depicting the blending or weighting of the two point servo networks of FIG. 1 which control the take-up reel motor, as the outputs of these networks are weighted in accordance with the tape quantity on the take-up reel.

The corresponding energization of motor 45 is depicted in FIG. 3 by the summation of 34 and 35, that is, the respective weighted outputs of EOT servo 24 and BOT servo 26 for this particular tape distribution.

When substantially all of the tape is on supply reel 10, energization of reel motor 44 is nominally represented by point 33, in accordance with the error sensed by BOT servo 25. When substantially all of the tape is on take-up reel 11, energization of motor 44 is nominally represented by point 36, in accordance with the error sensed by EOT servo 23. When the tape distribution is somewhere between these two extremes, motor 44 is energized by a blending of the outputs of BOT servo 25 and EOT servo 23, as shown in FIG. 2 at 80 percent distribution point 41.

When the tape distribution is 50 percent, one-half of the output of BOT servo 25 is summed with one-half of the output of EOT servo 23. When greater than 50 percent of the tape resides on the supply reel, the weighting of the output of BOT servo 25 is greater than that of EOT servo 23. When less than 50 percent of the tape resides on the supply reel, the weighting of the output EOT servo 23 is greater than that of BOT servo 25.

In a similar manner, the weighted outputs of EOT servo 24 and BOT servo 26 control energization of reel motor 45, as shown in FIG. 3.

In the situation described, linear weighting or blending is assumed. However, the present invention is not to be limited to this linear relationship.

Servos 23–26 may be substantially identical electronic devices. By way of example FIG. 4 discloses EOT point servo 23 of FIG. 1. This point servo comprises an operational amplifier 50 which compares a reference parameter signal on conductor 51 to a feedback signal representing the actual parameter on conductor 19. The signal present on conductor 51 may, for example, be derived from FIG. 1's network 22.

These two signals are applied to inputs of operational amplifier 50 by way of resistors 52 and 53. The magnitude of resistors 52 and 53 determines the gain of servo 23. These resistors are selected to have magnitudes unique to the load imposed on motor 44 for the EOT condition, namely, with substantially all of the tape removed from supply reel 10.

More generally stated, EOT servo 23 is constructed and arranged to respond to input signals 51 and 19 in a manner to achieve direct energization (assuming weighting network 31 is not provided) of motor 44 which will achieve the desired tape parameter when the supply reel is substantially empty of tape, i.e., this is the design point of point servo 23. More specifically, with configurations as shown in FIG. 4 provided for each of the point servos, each point servo will include resistors 52 and 53 of unique magnitudes related to its assumed tape distribution, and as a result each point servo is constructed and arranged to directly energize its motor to achieve the desired tape parameter for its assumed point in the range of tape distribution.

Figure 4:
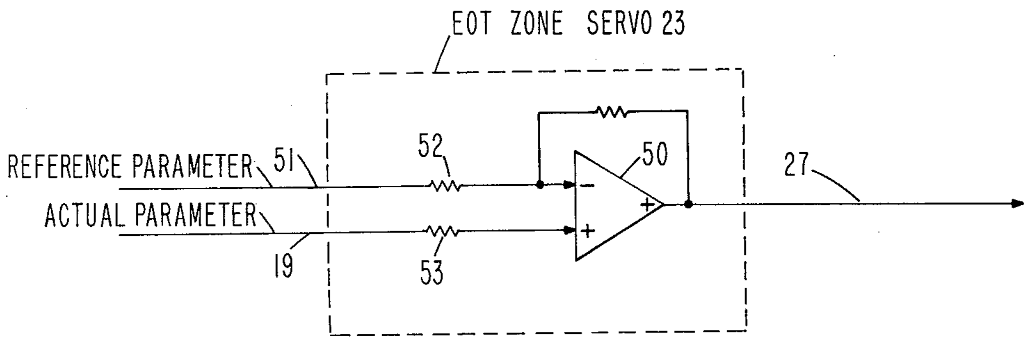
FIG. 4 is an exemplary showing of one of the point servos of FIG. 1.

The take-up reel's EOT servo 24 would be substantially identical to that shown in FIG. 4, wherein the resistors which are equivalent to resistors 52 and 53 are selected with different unique magnitudes, resulting in optimum energization of motor 45 for the condition when substantially all of the tape has been accumulated on take-up reel 11.

Operational amplifier 50, FIG. 4, is operative to compare the signals present on its two inputs and to provide an output signal on conductor 27 in accordance with this comparison. When the deviation between the reference parameter and the actual parameter is of the given value, for example, 2 percent, a known design calculated output appears on conductor 27. This design calculated output is such as would provide optimum correctivee energization of motor 44, without the use of weighting network 31, for the assumed tape distribution of the supply reel being substantially empty.

This is also true for the remaining three point servos of FIG. 1. Namely, the assumed 2 percent deviation between the desired parameter and the actual parameter results in each point servo providing its unique corrective output, calculated to provide corrective energization of motor 44, without the use of weighting network 31, for the assumed tape distribution of that point servo. The respective output signals, on conductors 27–30 of FIG. 1, are always the same for this assumed 2 percent deviation, irrespective of the actual tape distribution between reels 10 and 11.

These signals, present on conductors 27–30, are then subjected to further manipulation by weighting networks 31 and 32, before corrective energization is applied to motors 44 and 45. This manipulation is achieved in accordance with the actual tape distribution signal present on conductor 20.

As an alternative, and within the teachings of the present invention, point-servo pairs 25–26 and 23–24 may be constructed in accordance with the teachings of the commonly assigned co-pending patent application of John P. Mantey, Ser. No. 267,301, filed June 29, 1972.

Figure 5:
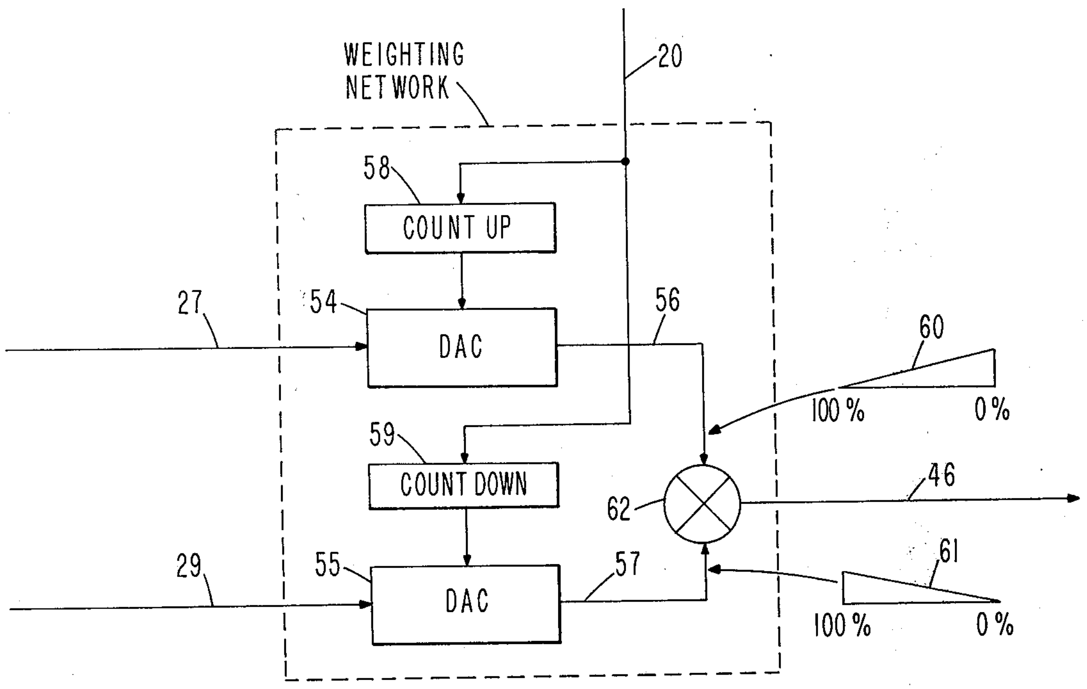
FIG. 5 is an exemplary showing of one of the weighting networks of FIG. 1.

FIG. 5 is an exemplary showing of weighting network 31 associated with point servos 23 and 25 and with motor 44. This network includes digital-to-analog converters (DAC's) 54 and 55. These DAC's can be defined as multiplying DAC's since their function is to receive the variable magnitude point servo outputs, on conductors 27 and 29, and to use these outputs as DAC supply voltages which are converted to weighted motor energizing voltages on conductors 56 and 57, the conversion being accomplished in accordance with actual tape distribution. In the embodiment of FIG. 5, a cyclic on/off signal on conductor 20 is effective to control counters 58 and 59. This signal is supplied, for example, by FIG. 1's digital tachometer 21. The residual count in these counters in any given time is a measure of tape distribution at that time and is effective to control its associated DAC. Considering the initialized state as the state in which all of the tape is present upon supply reel 10, counter 58 is initialized and counts up from this initialized state as the tape leaves supply reel 10. On the other hand, counter 59 is initialized to a higher count and counts down from this count as reel 10 empties. Thus, waveforms 60 and 61, corresponding to the waveforms of FIG. 2, show the manner in which the weighted signal present on conductors 56 and 57, respectively, varies between the initialized condition wherein all of the tape is present on supply reel 10 (100 percent) to the other extreme in the range of tape distribution wherein reel 10 is substantially empty (0 percent).

The thus weighted outputs 56 and 57 of point servos 23 and 25 are summed at junction 62, and a resultant motor energizing voltage is provided at conductor 46. Conductor 46 may, in a preferred embodiment, be connected to control a power amplifier (not shown) whose output, in turn, controls motor 44.

For purposes of simplicity, bidirectional control of motors 44 and 45 has not been shown. However, the present invention is to be considered to include such an arrangement.

Figure 7:
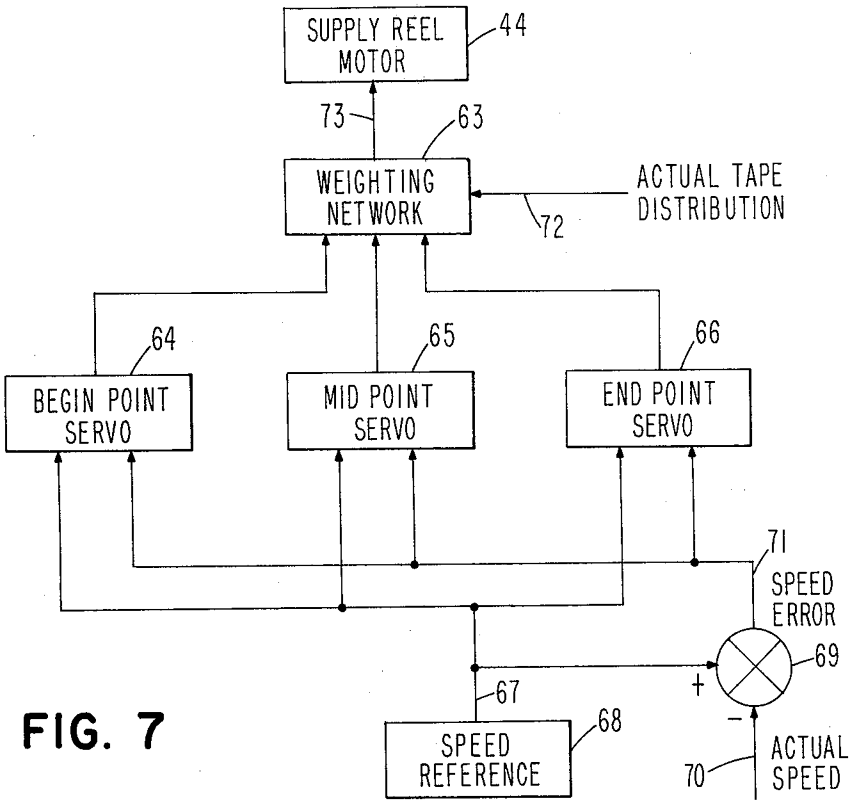
FIG. 7 is a diagrammatic showing of another embodiment of the present invention, wherein each reel motor is energized by the weighted outputs of three point servos.

As mentioned previously, each of the reel motors 44 and 45 of FIG. 1 may be energized by a plurality of point servos, greater than the two point servos shown in FIG. 1. In FIG. 7, supply reel motor 44 is shown energized by the output of weighting network 63, whose input in turn comprises the output of three point servos 64, 65, and 66. Each of these point servos receives a reference parameter signal, for example, a tape speed reference signal on conductor 67, as supplied by network 68. In this embodiment of the invention, the speed reference signal is applied to junction 69 whereat the reference parameter is compared to an actual parameter signal provided on conductor 70. As a result of this comparison, a parameter error signal is developed at conductor 71. This error signal is applied as a second input to the three point servos. Each of these point servos is constructed and arranged to respond to reference parameter signal 67 and to nominally achieve optimum energization of motor 44 for the point servo's assumed tape distribution point. Thus, begin-point servo 64 provides optimum energization of reel motor 44 when 100 percent of the tape resides on the supply reel. Mid-point servo 65 provides optimum motor energization when the tape is evenly distributed between the supply and take-up reels. End-point servo 66 provides optimum energization of motor 44 when the supply reel is substantially empty. Recognizing that control of the various point servos by reference parameter input signal 67 will not at all times achieve the desired tape parameter, a parameter error signal on conductor 71 functions to modify operation of the point servos to reduce the parameter error signal substantially to zero. Weighting network 63 is constructed and arranged to weight the output of the three point servos in accordance with the actual tape distribution signal present on conductor 72. This weighting function is graphically depicted in FIGS. 8, 9, and 10.

Figure 8:
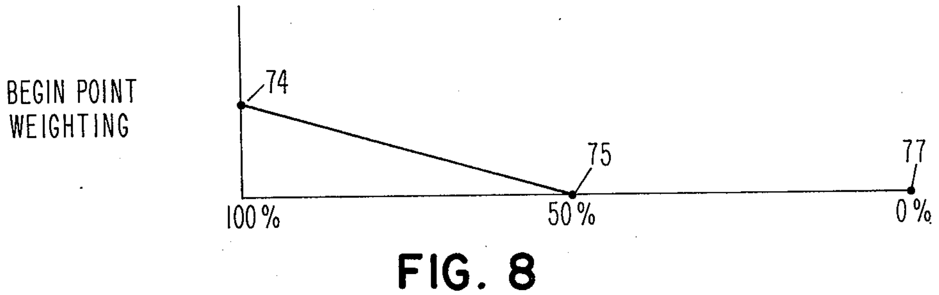
FIG. 8 is a graph depicting the weighting of FIG. 7's begin-point servo as a function of the amount of tape on the supply reel.

In FIG. 8, the weighting of begin-point servo 64 is shown. As depicted therein, the contribution which the output of this point servo makes to weighting network output 73 is a maximum when all of the tape resides on the supply reel, as at condition 74, and reduces to a minimum when the tape is evenly distributed between the supply and take-up reels, as at condition 74.

Figure 9:
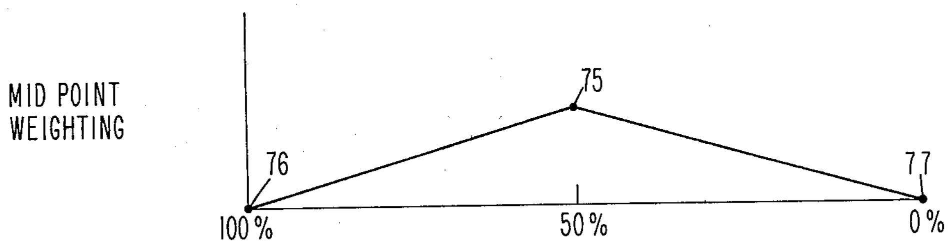
FIG. 9 is a graph depicting the weighting of FIG. 7's mid-point servo as a function of the amount of tape on the supply reel.

Referring to FIG. 9, it is seen that this same condition 75 for mid-point servo 65 indicates the maximum contribution which point servo 65 makes to weighting network output 73. Likewise, the two extremes of tape distribution, indicated by points 76 and 77, indicate minimum contribution by mid-zone servo 65 to output 73.

Figure 10:
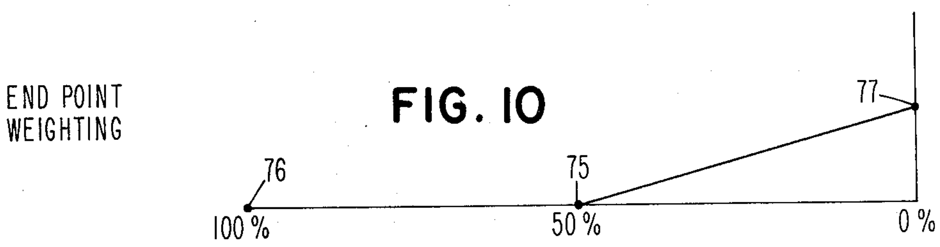
FIG. 10 is a graph depicting the weighting of FIG. 7's end-point servo as a function of the amount of tape on the supply reel.

Referring to FIG. 10, this graph depicts the fact that end-point servo 66 makes its maximum contribution to output 73 when substantially all of the tape has been removed from the supply reel, condition 77, and this contribution reduces to a minimum when the tape is substantially evenly distributed between the supply and take-up reels at point 75.

It is noted from FIG. 8 that point servo 64 contributes little, if any, to output 73 when more than 50 percent of the tape has been removed from the supply reel (condition 75–77). It is also noted from FIG. 10 that point servo 66 contributes little, if any, to output 73 when less than 50 percent of the tape has been removed from the supply reel (condition 75–75).

The linear control functions depicted in FIGS. 8, 9, and 10 may be accomplished by DAC structures such as shown in FIG. 5. With such an arrangement, the control structure depicted by FIGS. 8 and 10 is implemented by two DAC's, one for each of the point servos 64 and 66, whereas two DAC's would be connected to the output of point servo 65 to implement FIG. 9.

For convenience, reference has been made to the use of a DAC arrangement to implement weighting networks 31, 32, and 63. However, within the teachings of the present invention, potentiometer structures can be utilized and such structures can, is desired, be arranged to implement nonlinear functions, rather than linear functions as disclosed in FIGS. 2, 3, 8, 9, and 10.

Referring again to FIG. 1, an equation for expressing the desired energizing voltage for motor 44 is $$V_{46}=(1-l)V_{BOT}+lV_{EOT} \quad (1)$$

where $V_{46}$ is the output of weighting network 31, $l$ defines the length of the tape which has left supply reel 10 on its way to take-up reel 11, $V_{BOT}$ is output 29 of BOT servo 25, and $V_{EOT}$ is output 27 of EOT servo 23.

Equation (1) can be rewritten as $$V_{46}=V_{BOT}+l(V_{EOT}-V_{BOT}) \quad (2)$$

In practice, the tape is relatively long. However, for mathematical simplicity it is scaled to a unit length of 1.

From equations (1) and (2) it can be seen that when all of the tape is on the supply reel ($l$ equals zero) the output of weighting network 31 equals $V_{BOT}$; namely, the full output of BOT point servo 25. When the supply reel is substantially empty ($l$ equals 1) the output of weighting network 31 equals $V_{EOT}$; namely, the full output of EOT point servo 23. Since these two point servos are constructed and arranged such that their outputs produce optimum energizations of reel motor 44 for these two specific tape distributions (designated as points 33 and 36 of FIG. 2), the necessary motor energization is provided for these two tape distributions.

Figure 6:
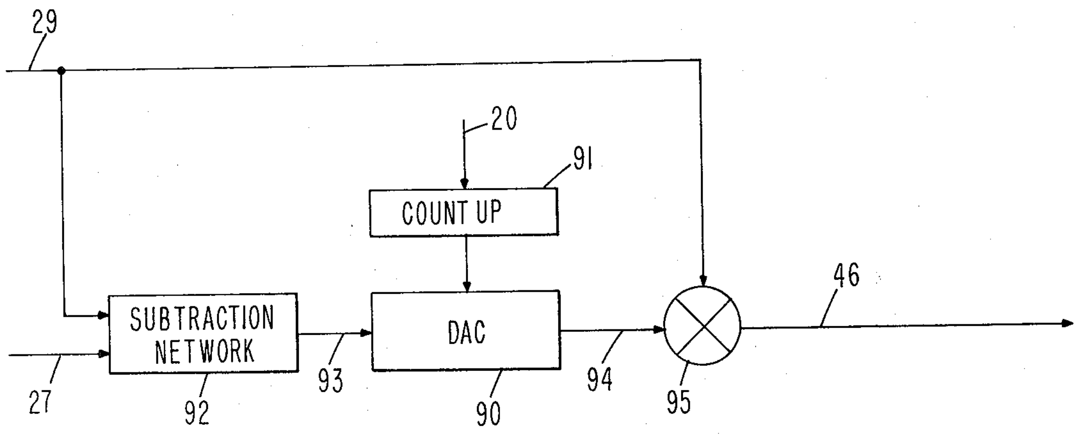
FIG. 6 is another exemplary showing of the weighting networks of FIG. 1.

As mentioned, FIG. 5 is an exemplary showing of one of the weighting networks of FIG. 1. FIG. 6 shows another such network, constructed to implement equation (2). In this figure, DAC 90 functions as a multiplying DAC. The DAC is controlled by counter 91, which counter counts up from an initialized state as tape leaves supply reel 10. The DAC's supply voltage is derived from subtraction network 92. This network operates to provide the $V_{EOT}-V_{BOT}$ portion of equation (2) on conductor 93. The DAC output 94 comprises the $l(V_{EOT}-V_{BOT})$ term of equation (2), and this term is summed with the $V_{BOT}$ term at summing junction 95. The output of summing junction 95 comprises $V_{46}$; namely, the energizing voltage for motor 44, FIG. 1.

Referring to FIG. 4, the value of resistors 52 and 53 of zone servo 23 (and the equivalent resistors of point servos 24, 25 and 26, FIG. 1) can be derived through the use of iterative procedures known to those skilled in the art, for example see the publication, OPTIMAL CONTROL: AN INTRODUCTION TO THE THEORY AND ITS APPLICATIONS, by M. Athens and P. L. Falb, McGraw-Hill Book Company, New York, 1966. The application of these procedures to a reel-to-reel tape transport is described in the above-mentioned co-pending application of J. P. Mantey.

Using this concept, equation (1) can be rewritten in the form $$V_{46}=(1-l)C_{BOT}X+lC_{EOT}X \quad (3)$$

where $C_{BOT}$ is a first resistor matrix determining a first control weighting of X. As is also apparent from FIG. 1, the term $C_{BOT}X$ is equivalent to the signal on conductor 29, whereas the term $C_{EOT}X$ is equivalent to the signal on conductor 27.

Using this concept, equation (2) can be written in the form $$V_{46}=C_{10}X+(C_{11}X)l \quad (4)$$

where X is the state vectors defining, for example, the speed/tension reference input and the speed/tension feedback input; where $C_{10}$ is a first resistor matrix determining a first control weighting of $X$; and where $C_{11}$ is a second resistor matrix determining a second control weighting of $X$.

Figure 11:
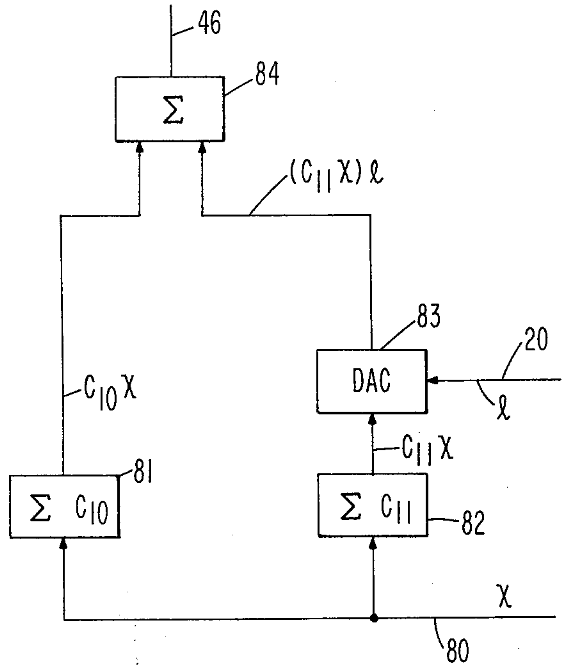
FIG. 11 is a diagrammatic showing of another embodiment of the present invention.

Equation (4) may be structurally expressed as shown in FIG. 11, wherein conductor 46 corresponds to conductor 46 of FIG. 1. Conductor 80 supplies the reference and feedback parameter signals to summation networks 81 and 82. These networks are constructed to provide unique weighting of the state vector signal X, as determined by the above-mentioned iterative procedures. For example, these summation networks may be constructed as shown in FIG. 4. The output of network 82 is supplied as a variable supply voltage to DAC 83, whereat the output is modified in accordance with the factor $l$. Factor $l$ can be supplied as it was in FIG. 5 by a signal on conductor 20.

The outputs of network 81 and DAC 83 are supplied to a further summation network 84, and the output 46 of network 84 constitutes the supply voltage for motor 44 of FIG. 1.

In a similar fashion the structure of FIG. 11 is repeated for motor 45.

While networks 81, 82 and 84 have been shown as simple summation networks, these networks may include other active devices, such as amplifiers and inverters, within the teachings of this invention.

In drawing a correspondence between FIGS. 1 and 11, when $l$ equal zero, component 81 comprises BOT servo 25; when $l$ equals 1, components 81 and 82 comprise EOT servo 23; and components 83 and 84 comprise weighting network 31.

Equations (3) and (4) consider $V_{46}$ as a first order function of $l$. It may be desirable to consider the motor energizing voltage for motor 44 as a more complex (nonlinear) function of $l$. For example, $$V_{46}=C_{10}X+(C_{11}X)l+(C_{12}X)l^2 \quad (5)$$

Figure 12:
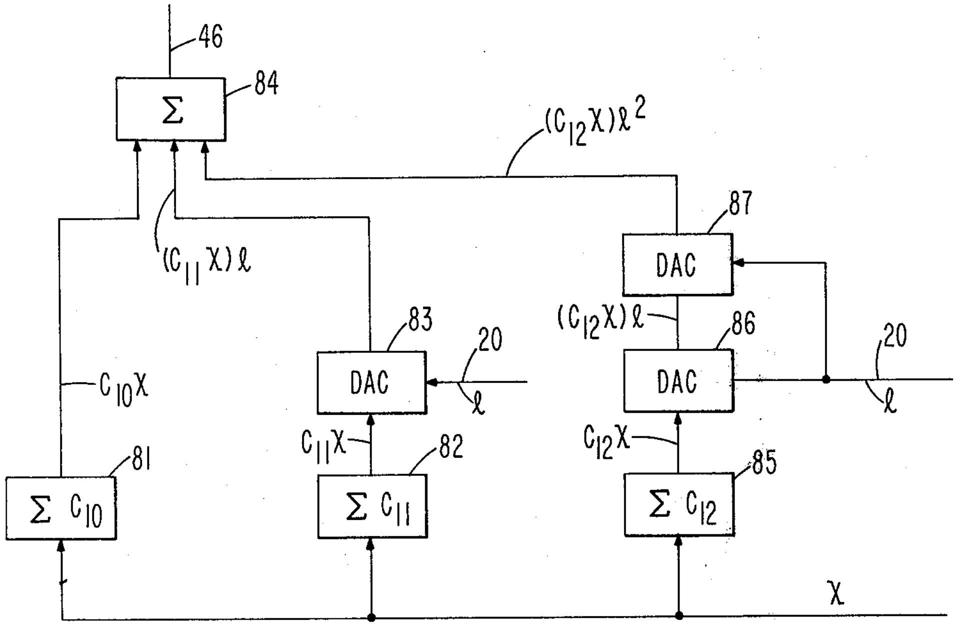
FIG. 12 is a diagrammatic showing of another embodiment of the present invention.

Equation (5) may be structurally expressed as shown in FIG. 12. This arrangement closely resembles that of FIG. 11, with the addition of a further summation network 85 whose output is supplied as a variable supply voltage to DAC 86. DAC 86 is controlled by conductor 20. The signal on conductor 20 comprises the factor $l$. The output of DAC 86 is applied to a second DAC 87. This DAC is also controlled by the factor $l$. Thus, the output of DAC 87 is a function of the term $(C_{12}X)l^2$ of equation (5).

Here again, the structure of FIG. 12 is repeated for motor 45, to provide the apparatus of FIG. 1.

While the invention has been particularly shown and described with reference to a preferred embodiment thereof, it will be understood by those skilled in the art that various changes in form and details may be made therein without departing from the spirit and scope of the invention.

What is claimed is:

1. A reel-to-reel web transport, comprising:

a supply reel and a motor for driving said supply reel, a take-up reel and a motor for driving said take-up reel, a length of unbuffered web extending between said reels, parameter sensing means providing an actual-web-parameter signal indicative of the magnitude of a parameter of said length of unbuffered web, reference means providing a reference parameter signal indicative of the desired magnitude of said parameter, a plurality of design-point servos constructed and arranged to be controlled by said parameter sensing means and said reference means and to provide an output signal in accordance with an assumed distribution of the web between said supply reel and said take-up reel, distribution sensing means providing an actual-web-distribution signal indicative of the actual web distribution between said reels, signal blending means controlled by said distribution sensing means, said blending means receiving the outputs of said point servos as a plurality of inputs, and being operative to weight said outputs in accordance with said actual-web-distribution signal to provide an output signal in accordance therewith, and means controlled by the output of said signal blending means operable to energize said supply reel motor and said take-up reel motor.

2. The reel-to-reel web transport defined in claim 1 wherein said parameter is web speed.

3. The reel-to-reel web transport defined in claim 2 wherein said parameter includes web tension.

4. The reel-to-reel web transport defined in claim 1 wherein said signal blending means is constructed and arranged to provide nonlinear weighting of said outputs as a function of said actual-web-distribution signal.

5. A reel-to-reel magnetic tape transport, comprising:

a supply reel and a motor for driving said supply reel, a take-up reel and a motor for driving said take-up reel, a length of unbuffered tape extending between said reels, a tape processing station adjacent said length of unbuffered tape and defining an operable interface therewith, the operating characteristics of which are related to tape speed and tension at said interface, speed sensing means operable to provide an output signal indicative of actual-tape-speed, tension sensing means operable to provide an output signal indicative of actual-tape-tension, reference means operable to provide signals indicative of the desired magnitudes of tape speed and tape tension, a plurality of pairs of point-servos, one of each pair for each of said supply reel motor and said take-up reel motor, said point servos being constructed in pairs, one for each reel motor, and being constructed and arranged to energize its motor so as to achieve said desired magnitudes of tape speed and tape tension for given assumed distribution of tape between said reels, tape distribution sensing means associated with said tape and operable to provide an output signal indicative of the actual-tape-distribution between said reels, a pair of signal weighting means, one for each of said motors, each of said signal weighting means having one output and a plurality of inputs, one for each pair of said point servos, means controlling each of said weighting means in accordance with the output signal of said tape distribution means, whereby said pair of point servos which instantaneously most nearly approximates said actual-tape-distribution is weighted to provide the major portion of the output of said signal weighting means, and means connecting the output of each of said pair of signal weighting means in controlling relation to one of said reel motors.

6. The reel-to-reel magnetic tape transport defined in claim 5 wherein said pair of signal weighting means are constructed and arranged to provide nonlinear weighting of the outputs of said point servos as a function of said actual-tape-distribution.

7. A reel-to-reel servomechanism for use in moving a length of web between a supply reel and a take-up reel at a controlled speed, comprising:

a pair of motors, one being connected to said supply reel and the other being connected to said take-up reel, transducer means cooperating with said web and operable to supply a signal indicating web speed, and a signal indicating web distribution between said two reels, a first pair of point servos receiving as inputs a speed command signal and said web speed signal, one of said servos being constructed and arranged to control said supply reel motor to achieve said command speed when said web is substantially all removed from said supply reel, and the other of said servos being constructed and arranged to control said take-up reel motor to achieve said command speed when said web is substantially all accumulated on said take-up reel, a second pair of point servos receiving as inputs said speed command signal and said web speed signal, one of said servos being constructed and arranged to control said supply reel motor to achieve said command speed when said web is substantially all accumulated on said supply reel, and the other of said servos being constructed and arranged to control said take-up reel motor to achieve said command speed when said web is substantially all removed from said take-up reel, a pair of controllable signal mixing networks, the first of which is connected to control energization of said supply reel motor and is operable to mix the outputs of said one of said first pair of servos and said one of said second pair of servos, and the second of which is connected to control energization of said supply reel motor and is operable to mix the outputs of said other of said first pair of servos and said other of said second pair of servos, and means connecting said signal indicative of the web distribution between said two reels in controlling relation to each of said mixing networks to control the blending of said point servo outputs as a function of the actual web distribution between said two reels.

8. The reel-to-reel servomechanism defined in claim 7, including:

transducer means cooperating with said web and operable to supply a signal indicating web tension, means supplying a tension command signal and said web tension signal as inputs to said first and second pair of point servos, wherein said one of said first pair of point servos is constructed and arranged to control said supply reel motor to achieve said command tension when said web is substantially all removed from said supply reel, and said other of said first pair of zone servos is constructed and arranged to control said take-up motor to achieve said command tension when said web is substantially all accumulated on said take-up reel, and wherein said one of said second pair of point servos is constructed and arranged to control said supply reel motor to achieve said command tension when said web is substantially all accumulated on said supply reel, and said other of said second pair of zone servos being constructed and arranged to control said take-up reel motor to achieve said command tension when said web is substantially all rewound from said take-up reel.

9. The reel-to-reel servomechanism defined in claim 7 wherein said pair of signal mixing networks are constructed and arranged to provide nonlinear mixing of the outputs of said servos as a function of said web distribution.

10. A motor control servomechanism for use in controlling the energization of a motor whose output rotation is coupled to a load whose inertia changes as a function of motor rotation, comprising:

parameter sensing means providing an actual-load-parameter signal indicative of the magnitude of a parameter, reference means providing a reference parameter signal indicative of the desired magnitude of said parameter, a plurality of design-point servos constructed and arranged to be controlled by said parameter sensing means and said reference means and to provide an output signal in accordance with an assumed load inertia, each of said point servos being constructed and arranged to energize said motor so as to achieve the desired magnitude of said parameter for a given load inertia, load inertia sensing means providing an actual-inertia signal indicative of the actual load inertia, signal weighting means controlled by said quantity sensing means, said weighting means receiving the outputs of said point servos as a plurality of inputs, and being operative to blend said outputs in accordance with said actual-inertia signal to provide an output in accordance therewith, and means controlled by the output of said signal blending means operable to energize said motor.

11. A motor control servomechanism as defined in claim 10 wherein said load comprises a web reel containing variable web quantity as a function of motor rotation, wherein said actual-load-parameter signal is indicative of the magnitude of a parameter of a length of web extending from said reel, and wherein said plurality of design-point servos provide an output signal in accordance with an assumed quantity of web on said reel.

12. The reel control servomechanism defined in claim 11 wherein said parameter is the web speed.

13. The reel control servomechanism defined in claim 12 wherein said parameter includes web tension.

14. The reel control servomechanism defined in claim 11 wherein said signal weighting means is constructed and arranged to provide nonlinear weighting blending as a function of said actual-web-quantity signal.

* * * * *